US007222542B2

(12) United States Patent
Eken et al.

(10) Patent No.: US 7,222,542 B2
(45) Date of Patent: May 29, 2007

(54) METHOD, SYSTEM, CONTROLLER AND COMPUTER PROGRAM PRODUCT FOR CONTROLLING THE FLOW OF A MULTIPHASE FLUID

(75) Inventors: Adriaan Nicolaas Eken, Rijswijk (NL); Gritienus Haandrikman, Amsterdam (NL); Marinus Gerardus Wilhelmus Maria Seelen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 35 days.

(21) Appl. No.: 11/311,090

(22) Filed: Dec. 19, 2005

(65) Prior Publication Data

US 2006/0150749 A1 Jul. 13, 2006

(30) Foreign Application Priority Data

Dec. 21, 2004 (EP) .................................. 04106803

(51) Int. Cl.
*G01F 1/44* (2006.01)

(52) U.S. Cl. .................................................. 73/861.63

(58) Field of Classification Search ..................... None
See application file for complete search history.

(56) References Cited

U.S. PATENT DOCUMENTS

| | | | | |
|---|---|---|---|---|
| 5,478,504 | A | 12/1995 | de Almeida Barbuto | 261/19 |
| 5,544,672 | A | 8/1996 | Payne et al. | 137/1 |
| 6,286,602 | B1 | 9/2001 | Lemetayer et al. | 166/311 |
| 6,390,114 | B1 | 5/2002 | Haandrikman et al. | 137/2 |
| 6,405,577 | B2 * | 6/2002 | Hanashiro et al. | 73/861.63 |
| 2003/0010204 | A1 | 1/2003 | Molyneux et al. | 95/22 |

FOREIGN PATENT DOCUMENTS

| | | |
|---|---|---|
| EP | 419522 | 1/1991 |
| EP | 767699 | 4/1997 |
| WO | 96/00604 | 1/1996 |
| WO | 01/34940 | 5/2001 |
| WO | 03/029611 | 4/2003 |

OTHER PUBLICATIONS

Proceedings of the 11th International Conference on Multiphase flow. San Remo. Italy. Jun. 2003. by G. Skofteland and J. -M. Godhavn.

European Search Report dated May 18, 2005 for EP Application 04106803.2.

* cited by examiner

*Primary Examiner*—Harshad Patel
(74) *Attorney, Agent, or Firm*—William E. Hickman

(57) ABSTRACT

A method, system, controller and computer program product, for controlling the flow of a multiphase fluid comprising gas and liquid in a conduit, which conduit is provided at a downstream side with a flow restriction and a valve having a variable aperture, which method comprises the steps of selecting a flow parameter of the multiphase fluid in the conduit as a function of a pressure difference over the flow restriction;

selecting a setpoint for the flow parameter;

allowing the multiphase fluid to flow at a selected setpoint of the aperture of the variable valve;

determining the pressure difference over the flow restriction and determining an actual value of the flow parameter from the pressure difference, without using a measurement of another variable in order to determine an actual gas/liquid ratio pertaining to the pressure difference at the flow restriction;

controlling the flow of the multiphase fluid by determining a deviation of the flow parameter from its setpoint, determining an updated setpoint for the aperture of the valve which is dependent on the deviation, and manipulating the aperture of the valve accordingly.

14 Claims, 1 Drawing Sheet

METHOD, SYSTEM, CONTROLLER AND COMPUTER PROGRAM PRODUCT FOR CONTROLLING THE FLOW OF A MULTIPHASE FLUID

FIELD OF THE INVENTION

The present invention relates to a method and system for controlling the flow of a multiphase fluid comprising gas and liquid in a conduit. The invention moreover relates to a controller and a computer program product.

BACKGROUND OF THE INVENTION

In the oil and gas industry, but also in other industries as the chemical or petrochemical industry it is often necessary to transport a multiphase fluid comprising liquid and gas through a conduit. For example, hydrocarbons (crude oil or condensate, sometimes with water) and gas need to be transported from a well through a pipeline to a process facility. In case of offshore oil production crude oil, production water and associated gas are generally simultaneously transported through a subsea pipeline to gas/liquid separating equipment located onshore or on an offshore platform. The pipeline or flowline system may include a riser section.

A particular problem in such operations is the occurrence of plug flow. In plug flow, a batch of one of the phases is formed and transported through the conduit. A batch of liquid is sometimes also referred to as a slug. In an undesirable situation, liquid slugs and gas surges are produced alternatingly through the conduit. Such an alternating pattern of liquid slugs and gas surges presents problems for downstream equipment such as a gas/liquid separator, as it imparts separation efficiency and capacity use of the separator.

Liquid slugs can be formed by operational changes, e.g. the increase of the fluid production during the start-up of a pipeline. Liquid slugs can also be formed due to the geometry of the conduit ("terrain slugs"), or due to an unstable liquid/gas interface ("hydrodynamic slugs"). In an oil/gas riser system to a processing unit, a small liquid plug at the riser foot has a tendency to grow due to the hydrostatic pressure that builds up in the riser pipe, and a volume of gas is formed behind the liquid slug. This phenomenon is also known as "severe slugging", whereas slugs formed upstream of the riser foot are commonly referred to as transient slugs.

EP-B-767699 and WO 01/34940 both disclose methods of preventing growth of liquid slugs in a stream of multiphase fluid, wherein the multiphase fluid is admitted into a gas/liquid separator having gas and liquid outlet valves, and wherein the valves are operated in response to one or more suitably selected control variables such as the liquid level in the separator, the liquid flow rate, gas flow rate, or the total volumetric flow rate from the separator.

US 2003/0010204 A1 discloses another method of controlling severe slugging in a riser of a pipeline arrangement, wherein also a gas/liquid separator is arranged at the upper end of the riser, and wherein the gas outlet from the separator is controlled in response to a pressure measured at the riser foot.

U.S. Pat. No. 6,286,602 discloses a method for controlling a device for transporting hydrocarbons in the form of a mixture of liquid and gas from a production means through an upward pipe, into which gas is injected at the lower end for lifting the hydrocarbons to a treatment plant. During production the flow is controlled by a controller. The controller compares a parameter which characterizes the start of an interruption in the flow of gaseous hydrocarbons, calculated from time averages of the pressure at the lower end of the pipe with a predetermined value, and manipulates both the gas injection rate and a downstream valve if the predetermined value is exceeded. If the predetermined value is not exceeded, the flowrate of produced hydrocarbons is compared with a target flowrate, and deviations are counteracted by manipulating the gas-injection rate.

In an article "Suppression of slugs in multiphase flow lines by active use of topside choke—Field experience and experimental results", Proceedings of the 11th International Conference on MULTIPHASE flow, San Remo, Italy, June 2003, by G. Skofteland and J.-M. Godhavn, a multiphase flow control method is disclosed wherein the volumetric flow is stabilized by manipulating a choke at the top side of a riser flowline. The volumetric flow is determined from the pressure difference over the choke, the choke position, and the density of the multiphase fluid which is measured using a gamma densitometer upstream of the choke.

It is an object of the present invention to provide a method for controlling multiphase flow in a flowline, in particular to suppress and control plug flow, which is robust and simple, and which requires a minimum of hardware for its operation.

SUMMARY OF THE INVENTION

To this end there is provided a method for controlling the flow of a multiphase fluid comprising gas and liquid in a conduit, which conduit is provided at a downstream side with a flow restriction and a valve having a variable aperture, which method comprises the steps of

- selecting a flow parameter of the multiphase fluid in the conduit as a function of a pressure difference over the flow restriction;
- selecting a setpoint for the flow parameter;
- allowing the multiphase fluid to flow at a selected setpoint of the aperture of the variable valve;
- determining the pressure difference over the flow restriction and determining an actual value of the flow parameter from the pressure difference, without using a measurement of another variable in order to determine an actual gas/liquid ratio pertaining to the pressure difference at the flow restriction;
- controlling the flow of the multiphase fluid by determining a deviation of the flow parameter from its setpoint, determining an updated setpoint for the aperture of the valve which is dependent on the deviation, and manipulating the aperture of the valve accordingly.

The invention is based on the insight gained by Applicant that an efficient control of multiphase fluid can be obtained by a relatively simple control loop that requires minimum hardware. A pressure difference is measured over a restriction at the downstream side of the conduit, and from this pressure difference a flow parameter is determined, without using a further measurement in order to determine an actual gas/liquid ratio pertaining to the pressure difference at the flow restriction ratio. So it is not needed for the present invention to install equipment for measuring data pertaining to the multiphase composition, e.g. a specific small separator for control purposes, an expensive multiphase flow meter or a gamma densitometer. In the prior art such equipment is used to determine a mass balance of the multiphase fluid, e.g. a gas mass fraction, and the changes thereof as a function of time at the location of the measurement. Using such data, accurate volumetric or mass flow rates, and changes thereof as a function of time, can be derived.

It has been realized however, that a suitable flow parameter for use as controlled variable in the multiphase flow control can be derived from the pressure data alone, and that efficient control is obtained when the aperture of the variable valve is used as the manipulated variable.

The pressure difference is measured repeatedly so as to monitor changes, wherein the frequency of pressure measurements is sufficiently high to allow corrective control. The subsequent control action also needs to be fast enough. The characteristic control time, which is the time between occurrence of a deviation of the flow parameter from its setpoint and the manipulating of the aperture is 30 seconds or shorter, preferably 10 seconds or shorter. Within this control time, an actual value of the pressure difference is measured, the flow parameter is calculated and compared with the setpoint of the flow parameter, and when a deviation from the setpoint is measured, a new setpoint for the aperture of the variable valve (manipulated variable) is computed, and the valve is manipulated accordingly.

Suitably, the flow parameter FP is selected as $FP=f \cdot C_v \cdot sqrt(\Delta p)$, wherein f is a proportionality factor; $C_v$ is a restriction coefficient; and $\Delta p$ is the pressure difference. The restriction coefficient is equal to the valve coefficient if a valve is used as the restriction. This coefficient is known a priori. For a valve, $C_v$ only depends on the valve opening.

Depending on the choice of the proportionality factor f, a flow parameter with different dimensions can be obtained. f can be chosen such that a mass flow rate or a volumetric flow rate is obtained. A suitable choice of the proportionality factor is also a constant, i.e. a factor that is independent of fluid density. In this case a flow rate with characteristics intermediate between mass and volumetric flow rate is obtained.

In a particular embodiment of the method an indication of a multiphase flow regime mode is obtained, and the proportionality factor and/or the setpoint of the flow parameter is modified in dependence of the multiphase flow regime. This allows the control system to respond particularly effectively to significant changes in the multiphase flow. The indication of the multiphase flow regime can for example be obtained by monitoring the time derivative of the pressure drop over the restriction, or from an acoustic sensor acoustically coupled to the conduit, or by monitoring a pressure at an upstream position in the conduit such as the riser bottom pressure.

The control loop described thus far can represent an inner control loop of a more complex control algorithm, including one or more outer control loops as well. An outer control loop differs from the inner control loop in its characteristic control time, which is generally much slower than for the inner control loop. One particular outer control loop can aim to control an average parameter such as the average pressure drop over the restriction or the average aperture of the valve towards a predetermined setpoint for that parameter. Such an outer control loop can serve to maximise production of multiphase fluid through the conduit. The average is suitably taken over at least 2 minutes, and in many cases longer such as 10 minutes or more, so that that characteristic time of controlling the average parameter is relatively long as well, at least 2 minutes, but perhaps also 15 minutes or several hours.

In a particularly advantageous embodiment of the invention the valve with variable opening is used as the flow restriction itself. Although the accuracy of determining the flow parameter from the pressure difference over a variable restriction at different apertures may be slightly less than using a fixed restriction, it was found that the accuracy is sufficient for purposes of multiphase flow control. On the other hand a simple and flexible hardware arrangement is obtained in this way.

A particularly important application of the method of the present invention is the case that the conduit is not provided with a gas injection means for influencing the flow of multiphase fluid in the conduit, e.g. lifting fluid up a riser column by means of gas injection. In the case of gas injection it is common to control multiphase flow also via manipulation of the gas injection valve opening. In the method of the present invention, all control action, at least of an inner control loop with a short control time of the order of seconds, is performed via the variable valve at the downstream position in the conduit.

In another aspect the invention provides a system for controlling, using a method according to the invention, the flow of a multiphase fluid comprising gas and liquid in a conduit, which system comprises a flow restriction and a valve having a variable aperture, for placement at a downstream side of the conduit, and further comprising means for allowing the multiphase fluid to flow at a selected setpoint of the aperture of the variable valve;

means for determining the pressure difference over the flow restriction and determining an actual value of the flow parameter from the pressure difference, without using a measurement of another variable in order to determine an actual gas/liquid ratio pertaining to the pressure difference at the flow restriction; and means for controlling the flow of the multiphase fluid by determining a deviation of a selected flow parameter of the multiphase fluid in the conduit, which flow parameter is a function of a pressure difference over the flow restriction, from a selected setpoint, for determining an updated setpoint for the aperture of the valve which is dependent on the deviation, and for manipulating the aperture of the valve accordingly.

In a further aspect the invention provides a controller for controlling, in a method according to the invention, the flow of a multiphase fluid comprising gas and liquid in a conduit having a flow restriction and a valve having a variable aperture at a downstream side of the conduit, which conduit is provided with means for allowing the multiphase fluid to flow at a selected setpoint of the aperture of the variable valve and with means for determining the pressure difference over the flow restriction and determining an actual value of the flow parameter from the pressure difference, without using a measurement of another variable in order to determine an actual gas/liquid ratio pertaining to the pressure difference at the flow restriction; which controller is arranged to determine a deviation of a selected flow parameter of the multiphase fluid in the conduit, which flow parameter is a function of a pressure difference over the flow restriction, from a selected setpoint, for determining an updated setpoint for the aperture of the valve which is dependent on the deviation, and to providing control instructions for manipulating the aperture of the valve accordingly.

In yet a further aspect the invention provides a computer program product for controlling, in a method according to the invention, the flow of a multiphase fluid comprising gas and liquid in a conduit having a flow restriction and a valve having a variable aperture at a downstream side of the conduit, which conduit is provided with means for allowing the multiphase fluid to flow at a selected setpoint of the aperture of the variable valve and with means for determining the pressure difference over the flow restriction and determining an actual value of the flow parameter from the pressure difference, without using a measurement of another variable in order to determine an actual gas/liquid ratio pertaining to the pressure difference at the flow restriction;

which computer program product comprises program code that is loadable into a data processing system, wherein the data processing system by running the program code is arranged to determine a deviation of a selected flow parameter of the multiphase fluid in the conduit, which flow parameter is a function of a pressure difference over the flow restriction, from a selected setpoint, for determining an updated setpoint for the aperture of the valve which is dependent on the deviation, and to provide control instructions for manipulating the aperture of the valve accordingly.

BRIEF DESCRIPTION OF THE DRAWINGS

An embodiment of the invention will now be described in more detail and with reference to the accompanying drawings, wherein.

DETAILED DESCRIPTION OF THE INVENTION

Figure 1:
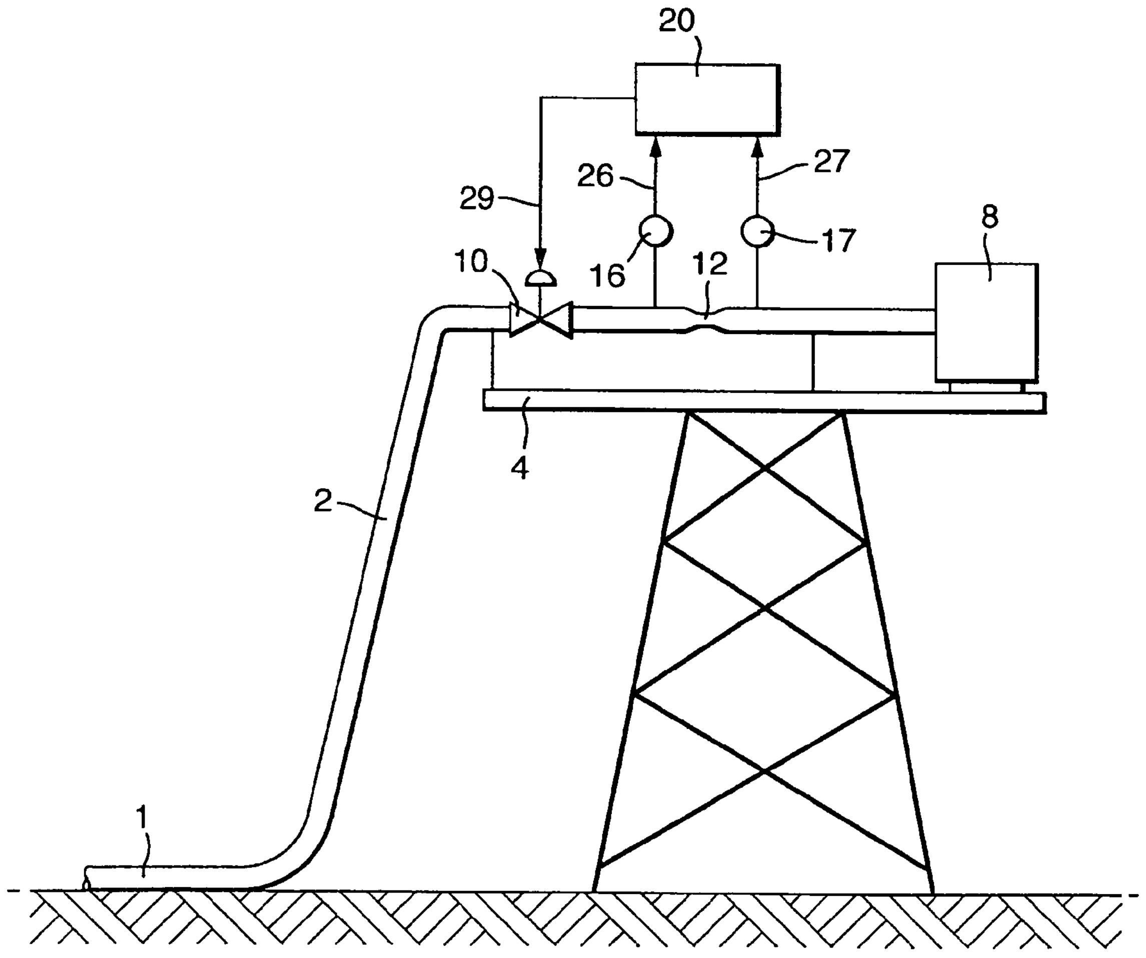
FIG. 1 shows schematically an embodiment of riser system with a flow controller according to the present invention.

Reference is made to FIG. 1. The Figure shows schematically a transport pipe 1 including a riser conduit 2, for transporting hydrocarbons produced from one or more upstream subsea wells (not shown) to a platform 4 above sea level, and for further processing in downstream equipment 8. At a downstream position along the transport pipe 1, on the platform 4, a control system is arranged, comprising a controllable variable valve 10, a flow restriction 12, means for determining the pressure difference over the flow restriction in the form of pressure sensors 16 and 17 upstream and downstream of the flow restriction, and a means for controlling in the form of controller 20 receiving input via lines 26, 27 from the pressure sensors 16, 17 and having an output via line 29 for a control signal to the controllable valve 10. Suitably, input about the aperture of the controllable valve 10 can also be read into the controller via line 29.

The controller suitably includes a data processing system such as a computer, preferably having a memory into which a computer program code can be loaded, from a computer program product. The computer program product, by running code in the data processing system, receives input from the pressure sensors and generates control instructions that are converted into control signals of the controller. The computer program product can be provided in any suitable form, including on a data carrier such as a tape, floppy disk, memory cartridge, CD or DVD, via a file transferable via a computer network, or on a programmable memory known as PROM or EPROM.

It will be understood that the sequence of variable valve and flow restriction could also be reversed. In a particular embodiment, the variable valve 10 is placed at the position and plays the role of the flow restriction 12, so that no separate flow restriction is needed.

In the method of the present invention a flow parameter is selected that depends on the pressure difference over the flow restriction. A suitable flow parameter FP for the flow of multiphase fluid through a variable valve forming a restriction is represented by the following relationship $$FP = f \cdot C_v \cdot \sqrt{\Delta p} = f \cdot F, \qquad (1)$$

wherein f is a (in general dimensionful) proportionality factor;

$C_v$ is a valve coefficient that characterizes the throughput at a given valve aperture v and is dependent on the aperture; and Δp is the pressure difference over the flow restriction (variable valve).

F is a generalized flow parameter. $C_v$ has the dimension $$\frac{\text{volume}}{\text{time} \cdot \text{pressure}^{\frac{1}{2}}}.$$

It is common to express $C_v$ in US engineering units $$\frac{US\ \text{gallons}}{\text{min} \cdot psi^{\frac{1}{2}}},$$

following a common definition $$C_v = Q\sqrt{\frac{G}{\Delta p}}$$

wherein Q is the volumetric flow in US gallons/min, $C_v$ is the valve coefficient in US gal/min/psi$^{1/2}$, Δp is the pressure drop in psi, and G is ratio of the fluid density ρ and the water density. If we convert to the following units Q*⌊m$^3$/h⌋, p*[bar], G=ρ*⌊kg/m$^3$⌋/1000⌊kg/m$^3$⌋, and keep for $C_v$ the common US units, this gives:

Q*=Q*0.003785*60

Δp*=Δp*0.068947

ρ*=G*1000 kg/m$^3$.

Substitution in the original definition for $C_V$, and omitting the * superscript gives:

$$C_v = \frac{1}{u} \cdot Q\sqrt{\frac{\rho}{\Delta p}}, \qquad (2)$$

wherein u is a conversion constant having the value 1/u=0.03656 m$^{3/2}$·kg$^{-1/2}$. In the following it will be assumed that $C_v$ and the other units discussed hereinabove have the units as given, and for that reason the constant u will appear in the equations. From equations (1) and (2) it follows that a volumetric flow rate FP=Q (units m$^3$/hr) is obtained if f is selected as $$f = f_q = u\sqrt{\frac{1}{\rho_m}} = u\sqrt{\frac{x}{\rho_g} + \frac{1-x}{\rho_l}}, \qquad (3)$$

wherein x=the gas mass fraction of the multiphase fluid;

$\rho_g$ and $\rho_l$ are the gas and liquid densities (kg/m$^3$), respectively; and wherein it has been assumed that $\Delta p/p_u \ll 1$, wherein $p_u$ is the pressure upstream of the restriction.

$\rho_m$ is an average density of the gas/liquid mixture.

A mass flow rate FP=W (units kg/hr) is obtained if f is selected as $$f = f_w = u^2 \frac{1}{f_q}. \quad (4)$$

In order to calculate either a mass or a volumetric flow rate, the gas mass fraction x of the multiphase fluid at the restriction is required. However in the method of the present invention there is not a separate measurement that can be used to this end, such as for example using a gamma densitometer. There are several suitable ways to still obtain a flow parameter that is suitable as a controlled variable.

One straightforward way is to select f=constant, independent on density. The flow parameter FP=F thus obtained has characteristics somewhere in between a mass and a volumetric flow rate. It has been found that a simple control scheme wherein this flow parameter is held at a predetermined setpoint, by manipulating the variable valve accordingly, can already provide a significant suppression of liquid slugs and gas surges.

EXAMPLE 1

Consider a subsea pipeline with 0.3038 m inner diameter (12") producing liquid oil at a flowrate of 270 $m^3$/hr oil and gas at a flowrate of 300,000 $Sm^3$/d. The pipeline has a length of 13 km, and the import riser to the production has a height of 190 m. A variable production valve is used as the restriction, and the pressure upstream and downstream of the valve are monitored. The target average pressure upstream of the valve is 23 bara, and the downstream pressure is 20 bara. The gas density at 23 bara is 20.4 kg/$m^3$ and the liquid density is 785 kg/$m^3$. The gas volumetric and mass flow at 23 bara is 555 $m^3$/hr and 11322 kg/hr, respectively. The liquid volumetric and mass flow at 23 bara is 270 $m^3$/hr and 211950 kg/hr, respectively. The gas mass fraction x at 23 bara is 0.050709. The total volumetric flow at 23 bara is 825 $m^3$/hr. The total mass flow at 23 bara is 223272 kg/hr.

The maximum liquid drain capacity of the downstream equipment is 340 $m^3$/hr, which equals 266900 kg/hr. If we assume a void fraction (gas volume fraction) of 0.5 in the liquid slug body, the maximum allowable volumetric flow at liquid slug production is 680 $m^3$/hr or 273836 kg/hr.

Using equations (1)-(3) it can be calculated that in this example $f_q$=0.0608 $m^{3/2}/kg^{1/2}$, $f_w$=16.451 $kg^{1/2}/m^{3/2}$, F=13572 $m^{3/2}\cdot kg^{1/2}$/hr.

In this example the flow parameter F is used as the controlled variable, and F=13572 $m^{3/2}\cdot kg^{1/2}$/hr is used as setpoint. The time-dependent pressure drop $\Delta p$ across the choke is measured through a differential pressure transducer, and the valve characteristic $C_v$ as a function of the valve aperture v is supplied by the valve vendor. The controller scheme uses F as the input parameter and v as the output parameter. A PID controller tries to keep F at its setpoint.

Maintaining this setpoint during production of a liquid slug body, would give a peak volumetric flow rate of 676 $m^3$/hr, which very close to the maximum allowable volumetric flow rate of 680 $m^3$/hr.

The liquid slug production will be followed by a gas surge. Assume that this gas surge has a void fraction of 0.85. Maintaining the setpoint for F at the given value during production of the gas surge would give a peak total volumetric flow rate of 1164 $m^3$/hr, and a corresponding peak volumetric gas rate of 989 $m^3$/hr. Although this is a relatively high value, it is still much less than the gas surge in an uncontrolled situation. Dynamic simulations have shown that the gas surge in this example without control can be as high as 9000 $m^3$/hr.

So, in this example a fairly good slug control is achieved with a very simple flow parameter and using a fixed setpoint.

It is also possible to estimate the mass or volumetric flow rate by estimating $f_w$ or $f_q$, without measuring a separate parameter pertaining to the actual gas/liquid ratio at the restriction. An estimate can for example be obtained by using an average gas mass fraction $x_{av}$ of the multiphase fluid that is produced. Such an average gas mass fraction can for example be obtained by analyzing the overall gas and liquid streams obtained at downstream separation equipment. So, in equation 2 or 3, instead of using the actual gas mass fraction of the multiphase fluid causing the pressure drop at the restriction, an average gas mass fraction $x_{av}$ is used. In order to restore some dependency on fluctuations in multiphase flow over time, deviations of the upstream pressure $p_u$ from a reference pressure $p_{ref}$ can be considered, e.g. by using $$f_q = u\sqrt{\left(\frac{x_{av}}{\rho_g} + \frac{1 - x_{av}}{\rho_1}\right)p_{ref}} \cdot \frac{1}{\sqrt{p_u}}. \quad (4)$$

Such an approximation can in particular be used when $\Delta p/p_u$<<1.

Estimating $f_w$ or $f_q$ can also be facilitated if there is information about the multiphase flow regime, i.e. predominantly liquid, gas or mixed gas/liquid flow. When it is known too that the fluid is predominantly liquid, then $f_q$ can be selected as u/sqrt($\rho_1$), and when it is predominantly gas, as u/sqrt($\rho_g$).

An even better control of the multiphase flow in particular for transient slugs (true?) can be obtained if the setpoint of the flow parameter is selected according to the multiphase flow regime. During normal operation, i.e. without plug flow, the liquid/gas mixture mode applies. When a (transient) liquid slug arrives, a liquid only control mode can be selected. The tail of the liquid slug can be handled in the liquid/gas mixture mode again. During the gas surge following the liquid slug a gas only mode is selected.

The switching between the 3 modes can determined by monitoring the time derivative of the pressure drop across the restriction or valve, i.e. the time-dependent signal $$A(t) = \frac{d(\Delta p)}{dt}.$$

The appropriate mode can then be chosen as follows:

Liquid/gas mixture if $A_G$<A(t)<$A_L$;

Liquid only mode if A(t)>$A_L$;

Gas only mode if A(t)<$A_G$.

Here $A_L$ and $A_G$ are constants with a predetermined positive and negative value, respectively.

It was found that an advantageous flow parameter for switching operation is the total volumetric flow rate Q. The volumetric flow in the three modes can be determined as follows:

- $Q = Q_l = uC_v\sqrt{\frac{\Delta p}{\rho_l}}$ for liquid only mode;

- $Q = Q_g = uC_v\sqrt{\frac{\Delta p}{\rho_g}}$ for gas only mode, with $\rho_g = C^* \cdot \rho_u$. The constant C* follows from the thermodynamic gas law. The pressure $p_u$ is the pressure upstream of the choke;

$$Q = Q_m = uC_v\sqrt{\frac{\Delta p}{\rho_m}}$$

for the liquid/gas mixture mode;
with $$\frac{1}{\rho_m} = \frac{x_{av}}{\rho_g} + \frac{1 - x_{av}}{\rho_1}\frac{p_{ref}}{p_u},$$

and wherein it is assumed that $p_{ref}$ is chosen close to $p_u$. The averaged gas mass fraction $x_{av}$ can be determined from the production data (or from the composition of the produced fluids). The reference pressure $p_{ref}$ can be taken as the time averaged pressure upstream of the choke.

In principle changing from one mode to another, would also require changing the respective set point for Q. It has been found that the set points for the volumetric flow in the modes with liquid/gas mixture, and with gas only can suitably be taken the same. The set point is determined such that the time-averaged pressure drop over the valve has a pre-defined value (typically between 1 and 3 bar). The set point for the volumetric flow during liquid only production is chosen such that the produced liquids do not exceed the available liquid drain capacity of the downstream separator.

Using the volumetric flow rate as controlled flow parameter and switching the setpoint is just an example, and it will be appreciated that the same goal can be achieved in different ways. For example, it is possible to maintain the same setpoint for all three modes but to use a corresponding correction factor for the densities in the above equations in one or more modes. In another alternative, in the three equations for volumetric flow rates in different modes, the density terms can be brought from the right side to the left side of the equation, and one obtains equations for the generalized flow parameter $F=C_v \cdot \mathrm{sqrt}(\Delta p)$. So F can equally well be chosen as controlled variable, with an appropriate choice of setpoints for different modes.

EXAMPLE 2

Consider the same subsea pipeline with the same operating parameters as in Example 1. The volumetric flow rate Q is used as controlled variable, and is determined from monitoring the pressure difference over the variable valve as described hereinbefore. Also, the time derivative of the pressure difference is determined and evaluated, so as to determine the mode of multiphase flow. The maximum liquid drain capacity is 340 $m^3$/hr, and this value is taken as the setpoint for the volumetric flow in the liquid only mode. In this way liquid slugs can be fully handled that do not have a void fraction at all. The control is setpoint for the gas only and mixed modes is chosen as 825 $m^3$/hr. The liquid slug production will be followed by a gas surge. Assume that this gas surge has a void fraction of 0.85. With a volumetric set point of for the gas only mode, the peak gas production is (0.85×825=) 701 $m^3$/hr. The setpoint is switched according to the indication of the multiphase flow mode. Switching the setpoint thus provides a tailored control for multiphase flow in various flow modes.

The flow control according to the present invention can be the central part or inner loop of a more complex control algorithm, including one or more outer control loops as well. An outer control loop differs from the inner control loop in its characteristic control time, which is generally much slower than for the inner control loop. One particular outer control loop can aim to control an average parameter such as the average pressure drop over the restriction or the average aperture of the production valve, or the average consumption of lift gas towards a predetermined setpoint for that parameter.

Such an outer control loop can serve to maximise production of multiphase fluid through the conduit, by aiming to keep the variable production valve at the top of the production tubing in a nearly open position, so as to minimize the pressure drop in the long term and at the same time leave some control margin to counteract short-term fluctuations. An outer control loop can also aim to minimize consumption of lift gas by acting on an annulus valve.

For determining an average parameter in an outer control loop the average is suitably taken over at least 2 minutes, and in many cases longer, such as 10 minutes or more, so that that characteristic time of controlling the average parameter is relatively long as well, at least 2 minutes, but perhaps also 15 minutes or several hours; this characteristic time depends on the total volume of the conduit.

The application of the present invention is not limited to risers from subsea pipelines, but can be applied in many multiphase flow situations, such as in hydrocarbon production from subsurface formations, in downstream processing in refineries or chemical plants, and is also not limited to situations wherein the multiphase fluid flows upwards.

It shall be clear that in case a separate fixed restriction is installed, a suitable flow parameter can be the pressure difference over the restriction itself.

The invention claimed is:

1. A method for controlling the flow of a multiphase fluid comprising gas and liquid in a conduit, which conduit is provided at a downstream side with a flow restriction and a valve having a variable aperture, which method comprises the steps of selecting a flow parameter of the multiphase fluid in the conduit as a function of a pressure difference over the flow restriction;

selecting a setpoint for the flow parameter;

allowing the multiphase fluid to flow at a selected setpoint of the aperture of the variable valve;

determining the pressure difference over the flow restriction and determining an actual value of the flow parameter from the pressure difference, without using a measurement of another variable in order to determine an actual gas/liquid ratio pertaining to the pressure difference at the flow restriction;

controlling the flow of the multiphase fluid by determining a deviation of the flow parameter from its setpoint, determining an updated setpoint for the aperture of the valve which is dependent on the deviation, and manipulating the aperture of the valve accordingly.

2. The method according to claim 1, wherein the control time between occurrence of a deviation of the flow parameter from its setpoint and the manipulating of the aperture is 30 seconds or shorter, preferably 10 seconds or shorter.

3. The method according to claim 1, wherein the flow parameter is selected as $FP=f\cdot C_v.sqrt(\Delta p)$, wherein FP is the flow parameter;

f is a proportionality factor;

$C_v$ is a valve coefficient; and $\Delta p$ is the pressure difference.

4. The method according to claim 3, wherein an indication of a multiphase flow regime mode is obtained, and wherein the proportionality factor and/or the setpoint of the flow parameter is modified in dependence of the multiphase flow regime.

5. The method according to claim 4, wherein the indication of the multiphase flow regime is obtained by monitoring the time derivative of the pressure drop over the restriction, or from an acoustic sensor acoustically coupled to the conduit, or by monitoring a pressure at an upstream position in the conduit.

6. The method according to claim 3, wherein the proportionality factor is chosen such that the flow parameter is a volumetric flow rate, or a mass flow rate.

7. The method according to claim 3, wherein the proportionality factor is a constant.

8. The method according to claim 1, wherein the setpoint of the flow parameter is selected and if necessary adjusted such that a selected average parameter averaged over time periods of at least 2 minutes is controlled towards a predetermined setpoint for that parameter.

9. The method according to claim 8, wherein the average parameter is selected as an average pressure drop over the restriction, or an average aperture of the valve.

10. The method according to claim 1, wherein the valve with variable opening is used as the flow restriction.

11. The method according to claim 1, wherein the conduit is not provided with a gas injection means for influencing the flow of multiphase fluid in the conduit.

12. A system for controlling, the flow of a multiphase fluid comprising gas and liquid in a conduit, which system comprises:

a flow restriction;

a valve having a variable aperture such that the multiphase fluid can be allowed to flow at a selected setpoint of the aperture of the variable valve, for placement at a downstream side of the conduit;

means for determining the pressure difference over the flow restriction and determining an actual value of the flow parameter from the pressure difference, without using a measurement of another variable in order to determine an actual gas/liquid ratio pertaining to the pressure difference at the flow restriction; and means for controlling the flow of the multiphase fluid by determining a deviation of a selected flow parameter of the multiphase fluid in the conduit, which flow parameter is a function of a pressure difference over the flow restriction, from a selected setpoint, for determining an updated setpoint for the aperture of the valve which is dependent on the deviation, and for manipulating the aperture of the valve accordingly.

13. A controller for controlling the flow of a multiphase fluid comprising:

gas and liquid in a conduit having a flow restriction;

a valve having a variable aperture at a downstream side of the conduit, which conduit is provided with means for allowing the multiphase fluid to flow at a selected setpoint of the aperture of the variable valve and with means for determining the pressure difference over the flow restriction and determining an actual value of the flow parameter from the pressure difference, without using a measurement of another variable in order to determine an actual gas/liquid ratio pertaining to the pressure difference at the flow restriction;

which controller is arranged to determine a deviation of a selected flow parameter of the multiphase fluid in the conduit, which flow parameter is a function of a pressure difference over the flow restriction, from a selected setpoint, for determining an updated setpoint for the aperture of the valve which is dependent on the deviation, and to providing control instructions for manipulating the aperture of the valve accordingly.

14. A computer program product for controlling the flow of a multiphase fluid comprising gas and liquid in a conduit having a flow restriction and a valve having a variable aperture at a downstream side of the conduit, which conduit is provided with means for allowing the multiphase fluid to flow at a selected setpoint of the aperture of the variable valve and with means for determining the pressure difference over the flow restriction and determining an actual value of the flow parameter from the pressure difference, without using a measurement of another variable in order to determine an actual gas/liquid ratio pertaining to the pressure difference at the flow restriction;

which computer program product comprises program code that is loadable into a data processing system, wherein the data processing system by running the program code is arranged to determine a deviation of a selected flow parameter of the multiphase fluid in the conduit, which flow parameter is a function of a pressure difference over the flow restriction, from a selected setpoint, for determining an updated setpoint for the aperture of the valve which is dependent on the deviation, and to provide control instructions for manipulating the aperture of the valve accordingly.

* * * * *